United States Patent [19]

Finkle

[11] 4,413,808
[45] Nov. 8, 1983

[54] PORTABLE POWER DRIVEN WIRE PULLER

[76] Inventor: Louis J. Finkle, 9300 Palm St., Bellflower, Calif.

[21] Appl. No.: 215,045

[22] Filed: Dec. 10, 1980

Related U.S. Application Data

[63] Continuation of Ser. No. 148,740, May 12, 1980, abandoned.

[51] Int. Cl.³ .......................................... B65H 57/28
[52] U.S. Cl. .............................. 254/134.3 FT; 226/51
[58] Field of Search ............... 254/134.3 R, 134.3 FT, 254/294–296, 286, 382; 15/104.3 SN, 104.3 R; 242/158 R, 54 R; 226/49, 51

[56] References Cited

U.S. PATENT DOCUMENTS

| | | | |
|---|---|---|---|
| 2,718,376 | 9/1955 | Raney | 254/134.3 FT |
| 2,913,222 | 11/1959 | Kuzara | 254/134.3 FT |
| 3,145,972 | 8/1964 | Sweeney . | |
| 3,258,246 | 6/1966 | Turk et al. | 254/134.3 FT |
| 3,355,148 | 11/1967 | Botello et al. | 254/134.3 R |
| 3,610,582 | 10/1971 | Passoni | 254/134.3 FT |
| 3,612,487 | 10/1971 | Raney | 254/134.3 FT |
| 3,776,179 | 12/1973 | Raney et al. | 15/104.3 SN |
| 3,809,366 | 5/1974 | Crees | 254/134.3 FT |
| 3,859,687 | 1/1975 | Caperton | 254/134.3 FT |
| 3,887,163 | 6/1975 | Prange | 254/134.3 FT |
| 4,061,311 | 12/1977 | Yamasaki et al. | 254/331 |

*Primary Examiner*—Robert C. Watson
*Attorney, Agent, or Firm*—William C. Babcock

[57] ABSTRACT

A portable, power-driven device capable of being carried by an operator to force stiff but bendable fishing tape through an electrical conduit until engageable means on the free end of the tape project from the conduit. The free end of a length of wire is removably secured to the engageable means, with the device now being operated to retract the tape into a storage reel that forms a part thereof. As the tape is retracted, the wire is drawn through the conduit. The device is of such structure that it may exert a pull on the wire of a far greater magnitude than that possible by a single person, and as a result extremely long lengths of wire may be drawn through a conduit or other elongate confined space.

8 Claims, 9 Drawing Figures

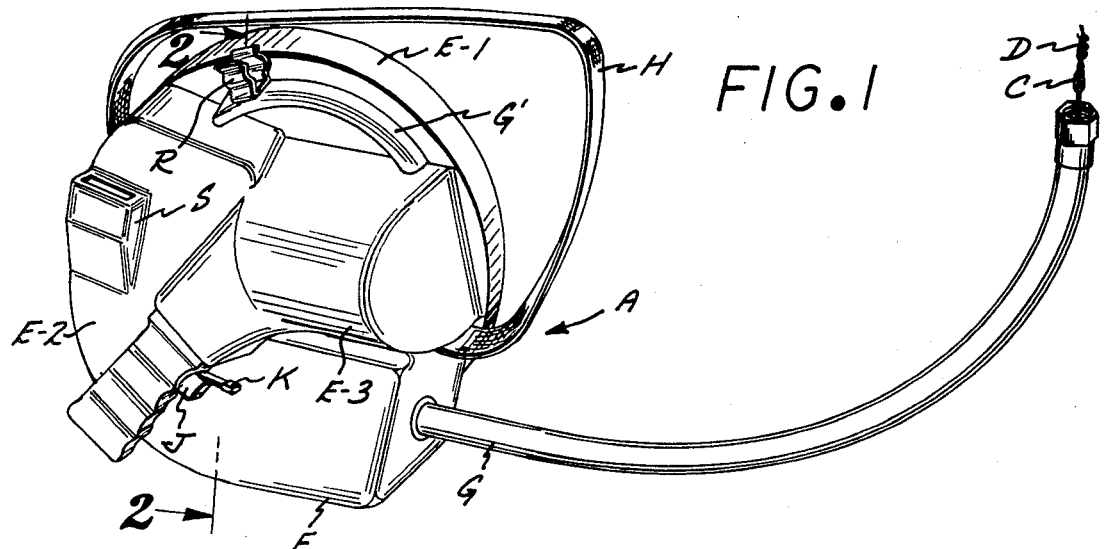
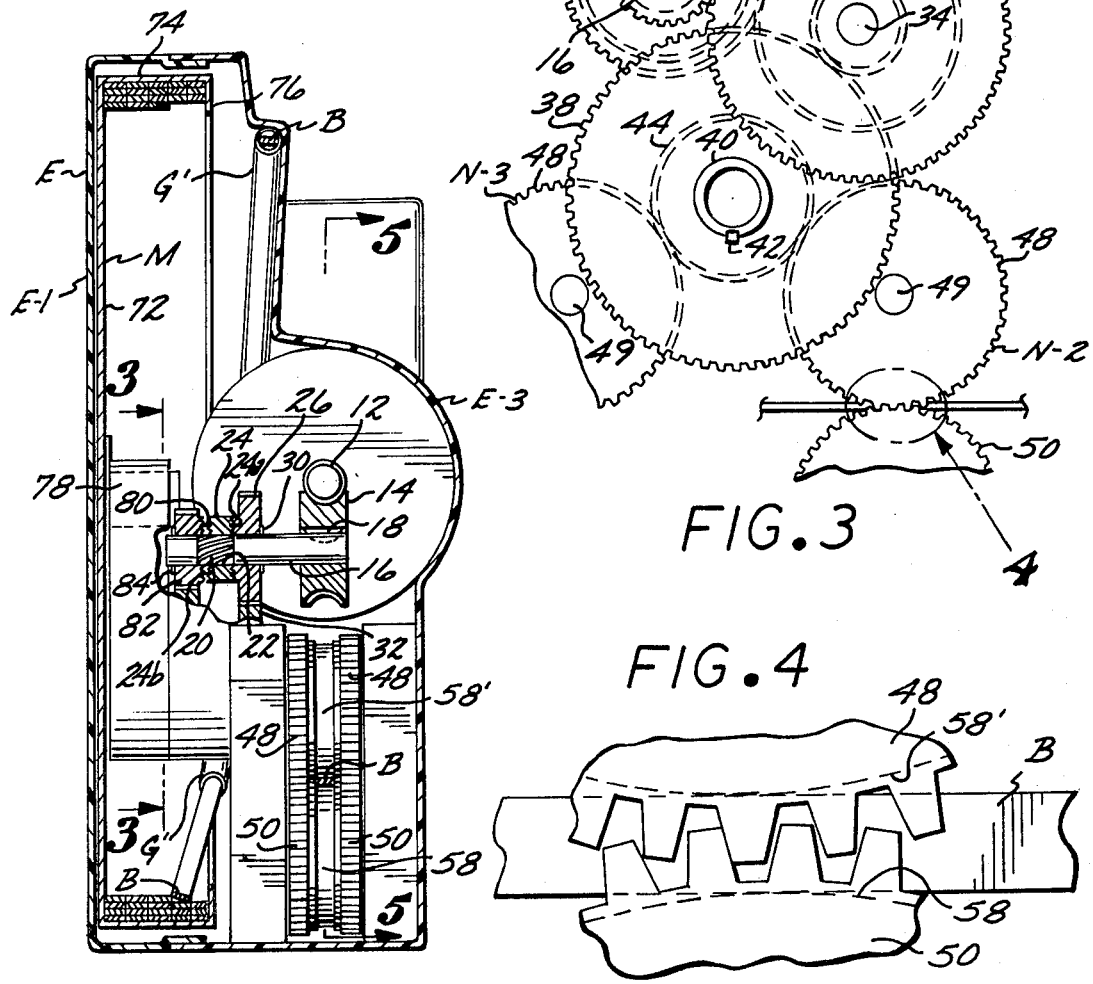

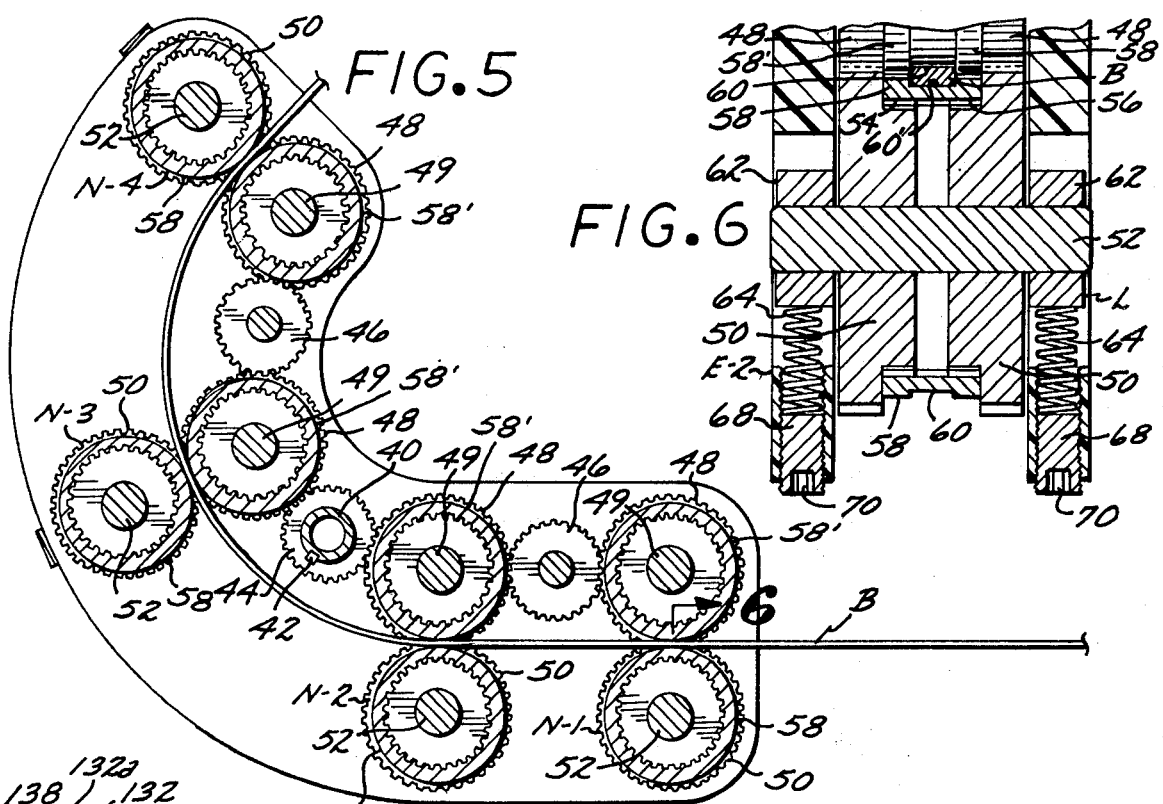
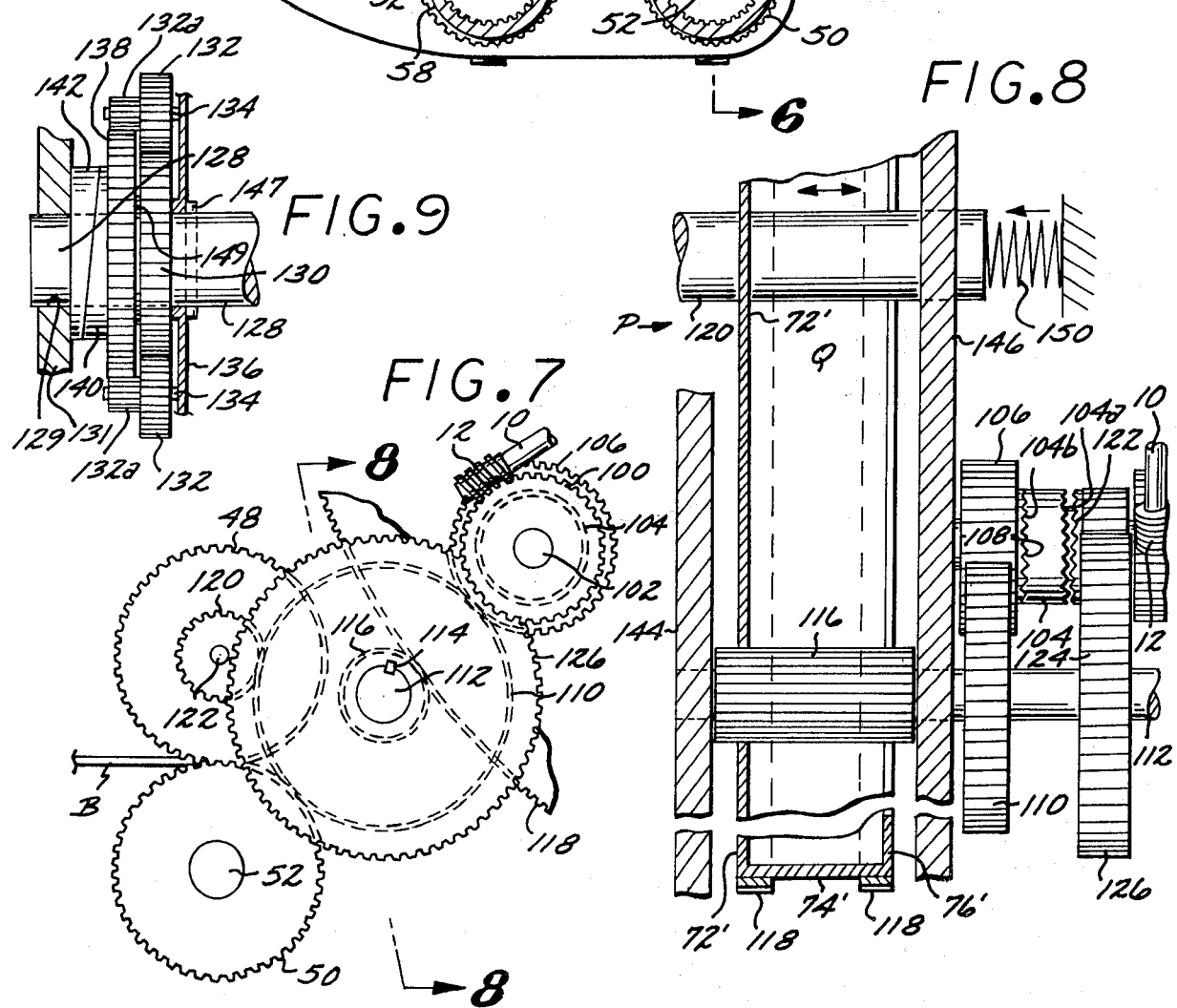

PORTABLE POWER DRIVEN WIRE PULLER

This is a continuation of application Ser. No. 148,740, filed May 12, 1980, now abandoned.

BACKGROUND OF THE INVENTION

1. Field of the Invention

Portable Power Driven Wire Puller.

2. Description of the Prior Art

In the electrical contracting field it is necessary to draw electrically insulated wire through conduits that may already have a group of parallel wires therein. The friction encountered in pulling additional wires through conduit that already has wires therein is substantial. To prevent additional wires in conduits being broken as they are pulled through conduit, an elongate steel but resilient fishing tape is forced through the conduit, and the wire to be pulled through the conduit attached to a free end of the tape.

The tape is now pulled in a direction to remove it from the conduit, and in so doing the wire attached to the tape is drawn through the conduit. However, on long runs of conduit, such as occur in high rise buildings, a number of electricians and electricians helpers may be required to pull the tape through the conduit. This operation is not only disagreeable to perform, as it is difficult to grip the tape so that the hands of the electricians will not slip relative thereto, but frequently a person's hands will be cut in this process. Also, this operation is expensive, for it can be performed only at a slow pace, and the time of a number of electricians and their helpers will be used up in performing the same.

A major object of the present invention is to provide a power operated device in which the fishing tape is stored within the confines thereof, with the tape capable of being drive from the device to move longitudinally through the conduit until it extends from the free end thereof, and wire being removably attachable to the free end of the tape to be drawn through the conduit as the tape is retracted into the device.

Another object of the present invention is to supply a device sufficiently light in weight as to be carried by the user thereof by a sling that extends over his shoulder, and with the device being actuated by electric power from a conventional outlet plug or box.

A still further object of the invention is to supply a device in which the tape has longitudinally spaced gripped between power rotated gripping means, and the force exerted by the gripping means being adjustable by the operator.

Yet another object of the invention is to supply a wire pulling device that is capable of being used for its intended purpose by a single person, and as a result the number of persons required to draw a wire through a long run of conduit being minimized with a consequent saving of both time and money.

SUMMARY OF THE INVENTION

The invention includes a light weight housing that is preferably carried by a user by a U-shaped strap that extends over and downwardly from one of his shoulders. The housing includes a rotatable fishing tape storage cage within the interior thereof. In a first form of the invention the storage cage rotates as tape is fed therein and removed therefrom. A second form of the invention has the storage cage not only rotate by power means, but laterally reciprocate so that the tape is wound smoothly thereon.

In both the first and second forms of the invention a sequence of spaced power driven tape gripping assemblies are situated within the housing and may be actuated by a reversible motor through a number of gears to either retract fishing tape into the housing or push the tape through conduit or an elongate confined space to a position where the wire to be pulled through the conduit or confined space is removably secured to the free end of the tape. After so securing the wire to the tape, the tape is retracted into the housing and draw the wire through the conduit. Wire may be drawn through a long run of conduit by a single person using the invention with a consequent saving of both time and money, as well as reducing the size of the personnel required to do a wire pulling job.

BRIEF DESCRIPTION OF THE DRAWINGS

FIG. 1 is a perspective view of the invention;

FIG. 2 is a transverse view of the invention shown in FIG. 1, taken on the line 2—2 thereof;

FIG. 3 is a fragmentary side elevational view of the drive assembly taken on the line 3—3 of FIG. 2;

FIG. 4 is a fragmentary side elevational view of one of the power driven tape gripping assemblies;

FIG. 5 is a longitudinal cross-sectional view of the invention taken on the line 5—5 of FIG. 2;

FIG. 6 is a transverse cross-sectional view of the invention taken on the line 6—6 of FIG. 5;

FIG. 7 is a side elevational view of the drive used in the second form of the invention;

FIG. 8 is a transverse cross-sectional view of the drive shown in FIG. 7 taken on the line 8—8 thereof; and FIG. 9 is a side elevational view of a mechanism used in laterally reciprocating a tape storage cage as the latter is power driven.

DESCRIPTION OF THE PREFERRED EMBODIMENTS

A portable power operated device A capable of being carried by a user to reel and in reel stiff resilient steel fishing tape B to force the latter through the conduit (not shown). The tape B has engageable means C on the free end thereof that may be removably secured to a wire D to draw the latter through conduit or other elongate confined space (not shown).

The device A includes a multiple piece housing E preferably formed from a tough, light weight plastic. Housing E as may be seen in FIG. 1 includes a circular portion E-1, generally L-shaped portion E-2, and a generally rectangular portion E-3 in which a reversible electric motor F is situated.

Motor F includes a drive shaft 10 shown in FIG. 3 that rotates a worm gear 12. A flexible tubular member G extends from housing H and is in communication with an extension G' that leads to the interior of circular housing portion E-1. Housing E when in use may be removably supported from a shoulder of a user (not shown) by a generally U-shaped flexible strap H that extends upwardly from the housing as illustrated in FIG. 1. The electric motor F is controlled by an off-on switch J, and reversing switch K of conventional design that is shown in FIG. 1.

Worm gear 12 as may be seen in FIG. 2 is in engagement with a first gear 14 that by a key 18 is secured to a first shaft 16. A portion of first shaft 16 has helical threads 20 defined thereon as shown in FIG. 2 that engage complementary threads in a transverse bore 22 formed in a circular drive member 24. Drive member 24 has first and second serrations 24a and 24b on opposite sides thereof. A second gear 26 is rotatably supported on first shaft 16, and is prevented from longitudinally to the right as viewed in FIG. 2 by a stop 30. The second gear 26 has third serrations 28 on the side thereof most adjacent first serrations 24a that may be engaged by the latter when the worm gear 12 is rotating in such a direction as to push fishing tape B from the housing E as will later be explained in detail.

The second gear 26 is in engagement with a third gear 32 that is secured to a second transverse shaft 34 as may be seen in FIG. 3. Shaft 34 has a fourth gear 36 secured thereto as shown in FIG. 3. Fourth gear 36 is in toothed engagement with a fifth gear 38 that is secured to a third transverse shaft 40 by a key 42 or other suitable fastening means. A sixth gear 44 is secured to third shaft 40 as illustrated in FIG. 3, and serves to drive first and second tape gripping assemblies N-2 and N-3. Each of the assemblies N-2 and N-3 includes a pair of spaced seventh gears 48 that are in tooth engagement with a pair of spaced eighth gears 50 situated thereunder as shown in FIG. 3.

The pair of spaced seventh gears 48 in second and third assemblies N-2 and N-3 are each in engagement with a pair of spaced idling gears 46, and these idling gears being in engagement with pairs of spaced seventh gears 48 that form a part of the first and fourth tape gripping assemblies N-1 and N-4 shown in FIG. 5. Each pair of spaced seventh gears 48 is rotatably supported on a transverse shaft 49, best seen in FIG. 3.

The first, second, third and fourth assemblies N-1, N-2, N-3 and N-4 are identical in structure, and accordingly only the first assembly N-1 shown in FIGS. 5 and 6 will be described in detail. The pair of transversely spaced seventh gears 48 are in toothed engagement with a pair of spaced eighth gears 50 that are rotatably supported on a fourth transverse shaft 52.

The pair of spaced eighth gears 50 have adjacently disposed hub portions 50a of smaller diameter on which first teeth 54 are defined that are in engagement with second teeth 56 formed on the interior of a first ring-shaped gripping member 58 that pressure contacts the lower surface of fishing tape B. The gripping member 58 has a circumferentially extending recess 60 defined in the external surface thereof in which sections of the fishing tape B are sequentially disposed as the tape is reeled and unreeled into and out of the invention A.

The fourth shaft 52 is supported between two laterally spaced blocks 62, that each has a helical spring 64 contacting the bottom thereof that at all times urges the block upwardly as best seen in FIG. 6. The lower portion of each spring 64 is disposed in a tapped bore 66 formed in the housing portion E-2, with the lower end of the spring abutting against the upper end of an externally threaded plug 68 that is disposed in a tapped bore 66. The outer end of each plug 68 has an outer slotted end 70 that may be removably engaged by a screw driver or the like (not shown). When each plug is rotated, the plug 68 moves longitudinally relative to the tapped bore 66 in which it is disposed to vary the degree of compression of the spring 64 with which it is associated as may be seen in FIG. 6. This variance in compression determines the force with which the first gripping member 58 is forced into contact with the lower surface of the fishing tape B.

The seventh double gears 48 are of the same structure as the eighth double gears 50 and support a second gripping member 58' of the same structure as the first gripping member 58 as shown in FIG. 6. The second gripping member 58' engages the top surface of fishing tape B as shown in FIG. 4. The seventh double gears 48 rotate on a fixed transverse shaft 49 as shown in FIG. 5. The second, third and fourth assemblies N-2, N-3 and N-4 are of the same structure as first assembly N-1 and are driven by pairs of seventh gears 124 and idlers 46. When motor F is rotating in a first direction the sequence of gears previously described actuate the first, second, third and fourth assemblies N-1, N-2, N-3 and N-4 to force fishing tape B from the elongate member G. The fishing tape B moves through an extension G' to the member G.

The fishing tape B prior to discharge through extension G' is stored in a circular tape storage cage M situated within the housing E as shown in FIG. 2. The cage M includes a circular plate 72 that has a rim 74 extending outwardly from the periphery thereof, and the rim on the extremity thereof supporting an inwardly extending ring-shaped flange 76. The cage M is rotatably supported on a transverse shaft 78 that is secured to the interior surface of housing portion E-2 as may be seen in FIG. 2, and the interior of the cage being in communication with the tubular extension G' through which tape B moves outwardly from the cage when the motor F rotates in a first direction.

When the electric motor F is caused to rotate in a second direction by moving the switch K to a second position, the first shaft 16 is driven in a second direction, with the drive member 24 moving to the left as viewed in FIG. 2 due to helical threads 20 rotating relative to the threaded bore 22. As the driving member moves to the left as above-described the first serrations 24a become disengaged from the third serrations 28 on second gear 26 and the second serrations 24b almost immediately becoming engaged with fourth serrations 80 on one side of ninth gear 82 that is rotatably supported on the left hand end portion of first shaft 16 as viewed in FIG. 2. Ninth gear 82 abuts against a stop 84 situated on the left side of ninth gear as viewed in FIG. 2. As ninth gear 82 has the fourth serrations 80 engaged by second serrations 24b of drive member 24, the ninth gear 82 is forced into pressure contact with stop 84 and starts to rotate with driving member 24. Second gear 26 is no longer being driven and of course no longer transmits power to the first, second, third and fourth assemblies N-1, N-2, N-3 and N-4. Ninth gear 82 is in toothed engagement with a tenth gear 86 that is secured to second shaft 34. Second shaft 34 is now driven in an opposite direction from that previously described. The idler gears 46 and seventh and eighth gears 48 and 50 are now driven in opposite directions to those first described, as are the first and second tape gripping members 50 and 50'. The fishing tape B is now drawn into the invention A by rotation of the gripping members 50 and 50' to be forced into the storage cage M in a coiled configuration. The fishing tape B due to the stiffness thereof assumes a coil configuration in the cage M, even though in this form of the invention the cage is not driven.

The fishing tape B will normally be drawn into the invention A after it has been extended through a conduit (not shown) and has the free end by engageable means C secured to a wire D. The engageable means may be an eye through which a free end of the wire D is looped. When the fishing tape B is retracted into the invention A, the wire D is drawn through the conduit. In actual practice a prototype of the invention A has been made that weighs approximately twenty-eight pounds and is capable of exerting an eight hundred pound pull on wire D when secured to fishing tape B.

An alternate form of drive P for the invention A is shown in FIGS. 7, 8 and 9 in which a shaft 10 is driven by a reversible motor F, which shaft has a worm gear 12 secured thereto. Worm gear 12 engages a first gear 100 that is secured to a first transverse shaft 102 that has a helical threads (not shown) on a portion thereof that engage like threads (not shown) on a transverse bore in a cylindrical driving member 104. The driving member 104 has first and second serrations 104a and 104b on opposite sides thereof. The first shaft 102 rotatably supports a second gear 106 in a fixed longitudinal position thereon, which gear has third serrations 108 thereon that are engaged by the second serrations 104b as shown in FIG. 8 when the shaft 102 is driven in a direction to force the fishing tape B outwardly relative to the drive P.

When second gear 106 rotates it drives a third gear 110 that is secured to a third transverse shaft 112 by a key 114 as shown in FIG. 7. Third shaft 112 supports an elongate fourth gear 116. The fourth gear 116 is in toothed engagement with a pair of laterally spaced fifth gears 118 that are ring-shaped and form a part of a tape storage cage Q that is of similar structure to previously described cage M. The cage Q includes a circular plate 72' that has a cylindrical rim 74' extending from the periphery thereof, and the free edge of the rim terminating in a ring-shaped flange 76' as best seen in FIG. 8.

The third gear 110 is in toothed engagement with a fifth gear 118 secured to fourth transverse shaft 122, which shaft has double gears 48 mounted thereon that are in toothed engagement with double gears 50 rotatably supported on a transverse shaft 52. The pairs of gears 48 and 50 are of the same structure as previously described and include circular tape gripping members 58 and 58'. The pair of gears 50 in the drive P have the shaft 52 urged upwardly by spring means of the same structure as shown in FIG. 6.

When it is desired to pull fishing tape B inwardly by use of the drive P, the direction of rotation of the electric motor F is reversed by use of the switch K. The driving member 104 now moves to the right as viewed in FIG. 8 due to the helical threads on transverse shaft 102 previously mentioned, with second serrations 104b beccoming disengaged from third serrations 108 and first serrations 104 engaging fourth serrations 122 on a sixth gear 120 as it rotates and drives a seventh gears 124 secured to third shaft 112. As third shaft 112 now rotates it drives third gear 110 that is in toothed engagement with fifth gear 120 that is secured to fourth shaft 122 and causes rotation of the double gears 48 and 50 as shown in FIG. 7 to retract the fishing tape onto the power drive tape storage cage Q. As the fishing tape B is retracted as above described it may of course be used to draw fishing tape through a conduit (not shown) as previously described.

The tape storage cage Q as it rotates also reciprocates longitudinally in order that the fishing tape B will be wound smoothly thereon, which action is accomplished by the mechanism shown in FIGS. 8 and 9. A shaft 128 extends from the center of plate 72' to which it is rigidly secured, and has the free end thereof journaled in a bearing 129 in a wall 131 that forms a part of housing E. An eighth gear 126 is secured to shaft 128 and is in engagement with a number of planetary gears 132 that are circumferentially spaced and rotatably supported on pins 134 that extend outwardly from a ring-shaped plate 136 that is rotatably supported on shaft 128. The planetary gears 132 have toothed extensions 132a projecting therefrom that are of smaller diameter. Extensions 132a engage a ninth gear 130 that is rotatably supported on shaft 128, with the ninth gear having a first cam member 140 rigidly secured thereto. The first cam member 140 rotates relative to a second cam member 142 secured to wall 131 as shown in FIG. 9. Gears 130 and 138 are separated by a washer 149. As shaft 128 is rotated due to fifth gears 118 rotating the same, the tape storage cage Q reciprocates due to the action of first and second cams 140 and 142. The cage Q has a free end of the tape B secured thereto, and a few wraps of the tape at all time remaining around the shaft 128 shown in FIG. 8. Plate 136 is prevented from moving longitudinally to the right on shaft 128 as viewed in FIG. 9 by a pin 147 that extends transversely through the shaft.

A pair of spaced supports 144 and 146 shown in FIG. 8 are situated in housing E and rotatably support shaft 128. Conventional spring means 150, such as a helical spring, abut against the right hand end of shaft 128 as shown in FIG. 8 and at all times tend to force the shaft to the left.

As the tape storage cage Q rotates, due to rotation of fifth gear 118, the shaft 128 rotates as does first cam 140, with the shaft 128 and cage Q not only rotating but reciprocating laterally due to the cam action and the action of a conventional compressed helical spring 150 that constantly tend to move shaft 128 to the right as viewed in FIG. 8.

The first form of the invention A as shown in FIGS. 1 to 6 inclusive and the second form illustrated in FIGS. 7 to 9 perform the same functions but in different manners. In the first form A, the tape B is fed out by rotation of the gripping members 58 and 58' and is retracted into the invention by the gripping members. In FIG. 5 it will be seen that there are four assemblies N-1 to N-4 each of which includes a pair of tape gripping members 58 and 58'.

In the first form A the drive when the switch K is in the first position is through the second gear 26 that is of substantially greater diameter than the ninth gear 130 which provides the drive when the switch K is in the second position when the tape B is being retracted into the first form and pulling wire D through a conduit. Thus, the tape B is fed out of the first form A of the invention at a faster rate than it is pulled thereinto. The tape B requires substantially less force to force it longitudinally through a conduit (not shown) than to pull a wire therethrough. In the first form A of the invention the tape storage cage M rotates to the resiliency of the coiled tape B contained therein. The cage M as tape B is forced therein or withdrawn therefrom rotates as a result thereof.

In the second form of the invention as shown in FIGS. 7 to 9 inclusive it will be seen that the second gear 106 that actuates the gripping members 58 and 58' is of substantially greater diameter than seventh gear 124 that actuates and results in the cage Q being rotated when the switch K is in the second position in which tape B is drawing wire D through a conduit (not shown). The second form of the invention differs from the first form A in that the cage Q is not free floating, but is power driven when tape B is being retracted with housing E. In the second form of the invention, the gripping members are only employed when tape B is being pushed through conduit (not shown).

The housing E as shown in FIG. 1 includes a clip R to which the tape guide member G may be secured when the invention is not in use. A metering gauge S of conventional design may be secured to housing E to indicate the footage that has been pushed from the interior thereof.

The two forms of the invention have been explained previously in detail and need not be repeated.

What is claimed is:

1. In combination with an elongate stiff, resilient steel tape having means on a first end thereof to which a length of wire may be secured to be pulled through a conduit, a portable power driven wire pulling device that may be used by an operator to push said tape through a conduit to have an end of said wire secured thereto and then retract said tape substantially into said device to pull said wire through said conduit, said wire pulling device including:
    a. a housing;
    b. a free floating tape storage cage rotatably supported in said housing and having a portion of said tape coiled therein;
    c. a reversible drive motor operatively associated with said housing;
    d. at least one pair of rotatably gripping members in said housing that pressure contact opposite sides of said tape;
    e. first and second gear trains in said housing in driving connection with said motor for selectively driving said gripping members in first or second directions; and
    f. first means that automatically impart rotation to said pair of gripping members through said first gear train when said motor rotates in a first direction to withdraw said tape from said free floating cage and push said tape into said conduit, and said first means when said motor operates in said second direction imparting rotation to said pair of gripping members through said second gear train in a second direction to draw said tape and wire from said conduit and direct said tape into said free floating cage to assume a coiled configuration therein.

2. A portable wire pulling device as defined in claim 1 in which the gears of said first and second gear trains are sized so that said tape is pushed into said conduit at a faster rate than it is withdrawn therefrom.

3. A portable wire pulling device as defined in claim 1 in which at least one of said gripping members in said pair of gripping members is spring loaded to maintain pressure frictional contact by said pair of gripping members on opposite sides of said tape.

4. A portable wire pulling device as defined in claim 3 which in addition includes adjustable means for varying the pressure said pair of gripping members exert on opposite sides of said tape.

5. A portable wire pulling device as defined in claim 1 that includes a plurality of pairs of rotatable tape gripping members and in addition gear means in said housing for causing the concurrent rotation of said plurality of pairs of gripping members.

6. A portable wire pulling device as defined in claim 1 which in addition includes a tubular tape guiding member projecting from said housing, and with a portion of said tape extending therethrough from said cage.

7. A wire pulling device as defined in claim 1 in which the gears in said first and second gear trains are of such relative size that said tape is pushed from said housing by said pair of gripping members at a faster rate than it is retracted into said housing by rotation of said cage.

8. A wire pulling device as defined in claim 1 in which there are a plurality of said pairs of rotatable gripping members in said housing that pressure contact opposite sides of said tape, with said pairs of gripping members being spaced from one another and so arranged as to form said tape gripped thereby into an acruate configuration as it is moved into or out of said housing.

* * * * *